United States Patent
Grossman et al.

(10) Patent No.: US 7,555,125 B2
(45) Date of Patent: Jun. 30, 2009

(54) SYSTEMS AND METHODS FOR GENERATION OF TIME-DEPENDENT CONTROL SIGNALS FOR VIDEO SIGNALS

(75) Inventors: Brad Grossman, Sunnyvale, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 742 days.

(21) Appl. No.: 10/640,627

(22) Filed: Aug. 14, 2003

(65) Prior Publication Data

US 2005/0036764 A1    Feb. 17, 2005

(51) Int. Cl.
*H04N 7/167* (2006.01)
(52) U.S. Cl. .................................. 380/218; 386/94
(58) Field of Classification Search .................. 380/218
See application file for complete search history.

(56) References Cited

U.S. PATENT DOCUMENTS 5,694,588 A * 12/1997 Ohara et al. ................ 712/225
6,035,094 A * 3/2000 Kori ............................ 386/94
6,826,352 B1 * 11/2004 Quan .......................... 386/94

* cited by examiner

*Primary Examiner*—Brandon S Hoffman
(74) *Attorney, Agent, or Firm*—Sterne, Kessler, Goldstein & Fox PLLC (57) ABSTRACT

Systems and methods for generation of time-dependent control signals for video signals are provided. A system is provided that includes a set of microsequencers, a programmable combinational logic (PCL) module, shared memory, an arbiter for sharing of memory by the microsequencers, stacks containing registers for microsequencer control, and a control interface. The system can efficiently provide control signals for video signals, implement the MACROVISION copy protection process, and provide other value added features. The method includes accessing programs from shared memory, such that a set of microsequencers can generate flags. These flags are then processed to generate one or more control signals used to support the outputting of video signals including those requiring MACROVISION copy protection.

21 Claims, 5 Drawing Sheets

SYSTEMS AND METHODS FOR GENERATION OF TIME-DEPENDENT CONTROL SIGNALS FOR VIDEO SIGNALS

BACKGROUND OF THE INVENTION

1. Field of Invention

The present invention relates to video processing, and more particularly to the generation of time-dependent control signals for video signals.

2. Background

Television systems have become increasingly complex as consumers continue to demand greater functionality and performance from television sets. Furthermore, the geographic diversity and business interests of manufacturers and service providers within the television and recording industries has lead to a plethora of analog and digital video formats. For example, analog video signal formats include National TV System Committee (NTSC), Phase Alternation Line Rate (PAL), and Sequential Couleur Avec Memoire (SECAM) television signals. Example digital video signal formats include ITU-R-656 and Digital Video Interface (DVI). Moreover, video processing devices, such as a televisions or cable set-top boxes, must be able to insert control signals within video signals as they are being processed for display. Such control signals are needed to support outputting video signals in different formats and to implement a variety of value added features including, for example, copy protection features, such as those contained within MACROVISION copy protection process standards. MACROVISION is a trademark of Macrovision Corporation.

MACROVISION copy protection technologies are designed to allow content owners to protect their videocassettes, digital Pay-Per-View (PPV) programs and digital video discs (DVD) from unauthorized recording on VCRs. In the context of PPV, MACROVISION copy protection allows consumers to view, but not record, programs that are distributed via digital set-top box decoders. To apply copy protection to a specific program, the direct broadcast satellite (DBS) operator or cable system operator transmits a software command from the uplink center or headend to its set-top decoders. An integrated circuit inside the decoder receives the command and adds the copy protection waveform to the video destined for the TV. The copy-protected signal is transparent on original program viewing, but causes copies made on the majority of VCRs to degrade to the extent that they no longer have entertainment value. MACROVISION's PPV copy protection technology degrades unauthorized copies on approximately 95 percent of the TV and VCR combinations in the market today. Virtually all digital set-tops in North America have copy protection capability, as do the majority of digital set-top boxes in international markets.

The MACROVISION copy protection process requires that integrated circuitry within a video processing device dynamically adjust to copy protection information transmitted with a video stream. In addition, the MACROVISION copy protection process is an evolving one in which the formats used periodically change. For example, the current MACROVISION copy protection process has been revised and updated several times, and is currently on Revision 7.1.S1. Implementation of the MACROVISION copy protection process has been previously implemented in hardware because of the need to quickly process MACROVISION input signals and generate control signals to adjust an output video signal. As a result, when revisions to the standard are made, updating deployed video processing devices that have used hardware to implement the MACROVISION standard is difficult.

What is needed are systems and methods for generation of time-dependent control signals that can efficiently provide control for video signals, implement the MACROVISION copy protection process, and provide other value added features.

SUMMARY OF THE INVENTION

The present invention provides systems and methods for generation of time-dependent control signals for video signals. A system is provided that includes a set of microsequencers, a programmable combinational logic (PCL) module, shared memory, an arbiter for sharing of memory by the microsequencers, stacks containing registers for microsequencer control, and a control interface. The system can efficiently provide control signals for video signals, implement the MACROVISION copy protection process, and provide other value added features. The method includes accessing programs from shared memory, such that a set of microsequencers can generate flags. These flags are then processed to generate one or more control signals used to support the outputting of video signals including those requiring MACROVISION copy protection.

The generation of control signals is software controlled, thereby allowing the system to be reconfigured in real time, and permitting simple modification to reflect changes in the MACROVISION copy protection process and other value added features for video signals. The invention provides an efficient way to flexibly produce time-dependent control signals for video signals.

Further embodiments, features, and advantages of the present inventions, as well as the structure and operation of the various embodiments of the present invention, are described below.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1:
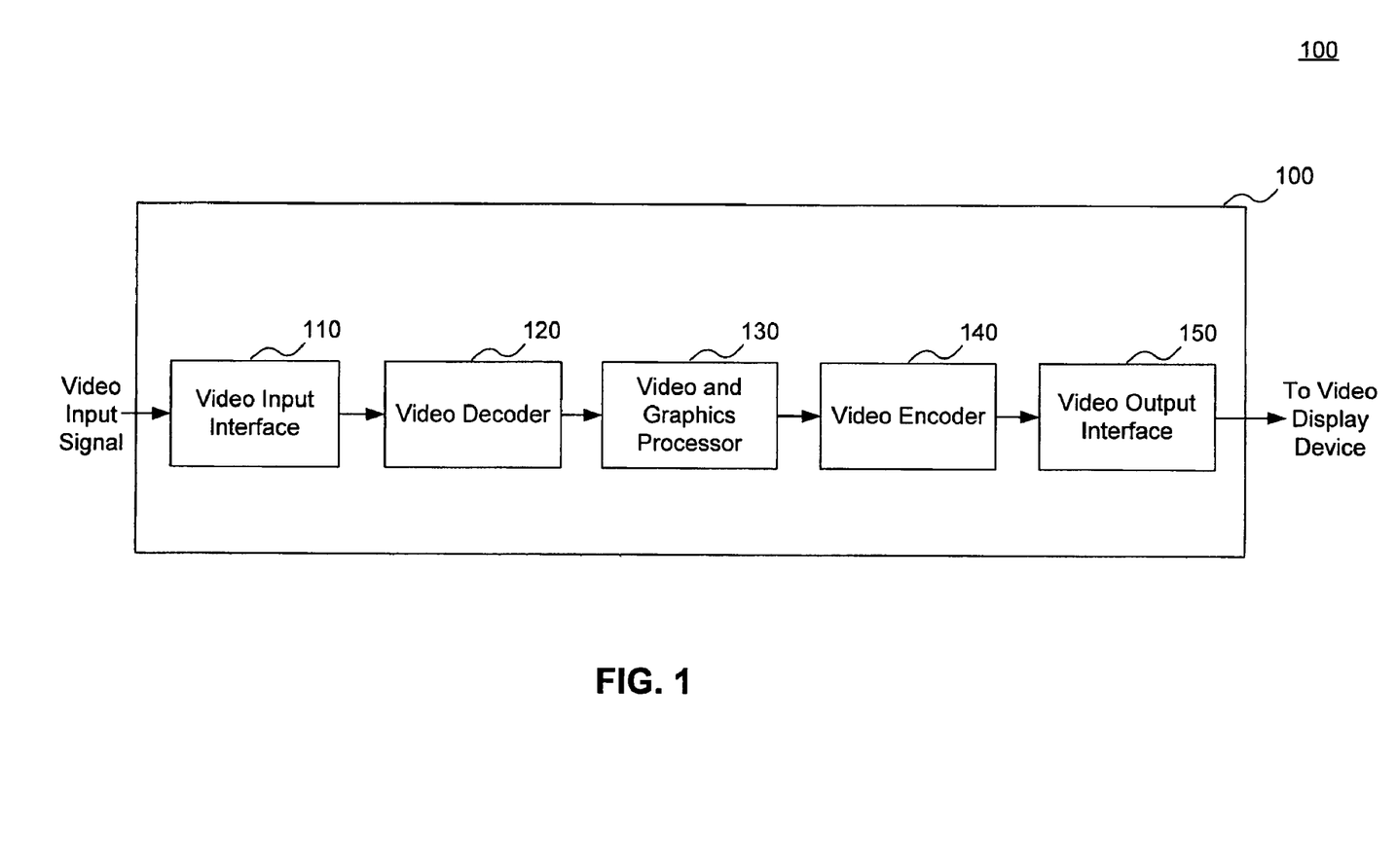
FIG. 1 is a diagram of a video processing system, according to an embodiment of the invention.

FIG. 1 provides a diagram of an example video processing system 100, according to an embodiment of the invention. A video processing system, such as video processing system 100, receives video input signals and manipulates the stream to properly format an output video stream. A video processing system, such as video processing system 100, can also integrate graphics and text (e.g., teletext) into the video stream and output a reformatted video stream. Finally, video processing system 100 can be used to implement value added features, such as copy protection features. Video processing system 100 will typically be located within a video processing device, such as a television or cable set-top box.

Video processing system 100 includes video input interface 110, video decoder 120, video and graphics processor 130, video encoder 140 and video output interface 150. Video input interface 110 receives a video input signal that can be either digital or analog. Video decoder 120 can support decoding and encoding of both analog and video input signals, and is coupled to the output of video input interface 110. Video decoder 120 can support high quality decoding of a standard definition analog composite video broadcasting signal (CVBS) and S-Video signals, for example. Similarly, video decoder 120 can decode digital video signals that comply with the International Telecommunications Union (ITU) standard ITU-R-656 at varying resolutions including 525i, 625i, and 240p.

Video and graphics processor 130 includes a variety of functions for processing video and graphics, including integrating video and graphics, and is coupled to the output of video decoder 120. In particular, video and graphics processor 130 can include MPEG graphics and video feeders, video scalers, capture blocks, and video compositors for combining video and graphics, and the like.

Video encoder 140 can support both standard and high definition video signals, and is coupled to the output of video and graphics processor 130. For example, video encoder 140 can support a variety of analog video standards (e.g., NTSC, PAL, SECAM, 480i, 480p, 720p, and 1080i), as well as digital video standards (e.g., ITU-R-656 and support for digital video interface (DVI) encoding). Video encoder 140 performs a variety of functions to encode an output video stream. In particular, video encoder 140 includes a color space converter to convert the input color to any component-color format. In addition, the video encoder 140 contains filters to determine a video channel's frequency response as required by the various video standards. Video encoder 140 can occasionally stall video signal processing to insert blanking signals into the video stream. For analog formats, these blanking signals can be quite elaborate—merging syncs, backporchs, pseudo syncs, automatic gain control (AGC) bursts, color burst envelops, and vertical blanking intervals. In addition, video encoder 140 can manipulate a video signal to support copy protection features, such as those of MACROVISION.

Video output interface 150 can include a set of analog and digital output interfaces to support a multitude of video standards, and is coupled to the output of video encoder 140. Video output interface 150 can be coupled to a video processing device, such as a television, a monitor, or a cable set top box to display a video signal or for further processing. Video processing system 100 can be implemented on a single integrated circuit or on multiple integrated circuits.

Figure 2:
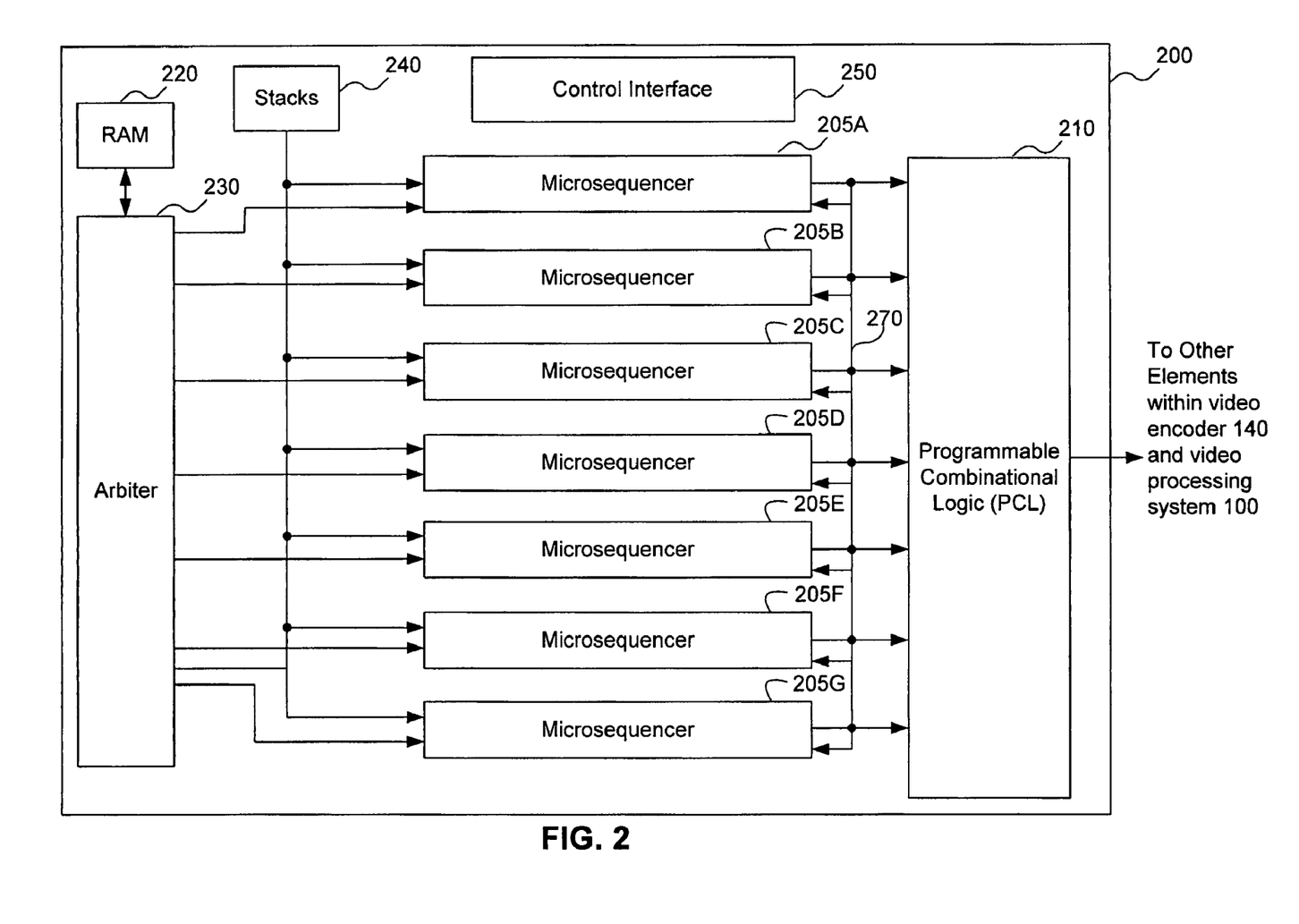
FIG. 2 is a diagram of a timing generator, according to an embodiment of the present invention.

FIG. 2 provides a diagram of timing generator 200, according to an embodiment of the present invention. A timing generator, such as timing generator 200, can exist within video encoder 140 to provide control signals to support output video signals and copy protection standards, such as the MACROVISION copy protection process. In particular, timing generator 200 can produce a variety of time-dependent control signals for various video formats, both digital and analog. For example, these can include horizontal and vertical synchronization signals and active video signals. Additional control signals for composite formats involve timing of the sub-carrier bursts (color bursts and bottles). Timing generator 200 can also generate control signals required for MACROVISION encoding, such as color stripe, AGC and pseudo sync pulses, reduced sync, and back porch pulses. Timing generator 200 specifies when these control signals should occur. Other portions of video encoder 140 or video processing system 100 actually insert or combine these signals.

Example control signals that can be generated by timing generator 200 are as follows:

Horizontal Sync Control Signal. This signal includes equalization and serration pulses, as well as pseudo-syncs for MACROVISION.

External Horizontal Control Signal. This signal is generally the same as the Horizontal Sync Control Signal, except that it generates a standard horizontal sync on every line and nothing else.

External Vertical Sync Control Signal. This signal is similar to a vertical active signal, but allows for differences in digital and analog formats.

Vertical Blanking Active Control Signal. This signal is used during blanking a line or if the vertical active signal analog line length is different than required by a vertical blanking interval encoder.

Color Burst Control Signal. This signal generates color burst timing. This control signal must also be on during MACROVISION color stripe.

U Flip Control Signal. This signal is used to generate MACROVISION color stripes. The signal inverts the phase of the U component of the color burst. This signal is not used to change the phase of the color burst for PAL/NSTC, which is done by another mechanism.

V Flip Control Signal. This signal is used to generate MACROVISION color stripes. The signal inverts the phase of the V component of the color burst. This signal is not used to change the phase of the color burst for PAL/NSTC, which is done by another mechanism.

V Sync Control Signal. This signal is used to support vertical sync.

V Blank Control Signal. This signal is used to support vertical blank.

Horizontal Active Video Control Signal. This signal supports the horizontal portion of active video. The signal denotes which areas of a horizontal line have video information within them.

Vertical Active Video Control Signal. This signal supports the vertical portion of active video. The signal denotes which vertical lines have video information on them.

Bottles Control Signal. This signal supports bottle signals needed for SECAM.

Odd/Even Control Signal. This signal denotes which field is currently being encoded. The falling edge of this signal is used as a new frame signal.

New Line Control Signal. This signal is used to mark a new line and is used in the determination of which phase to give to the current line.

AGC Control Signal. This signal is used to generate AGC pulses in an AGC multiplexer.

Back Porch Control Signal. This signal is used to generate the back porch signal to the AGC multiplexer.

Timing generator 200 includes a set of microsequencers, such as microsequencers 205A through 205G; programmable combinational logic (PCL) module 210; random access memory 220; arbiter 230; stacks 240; and control interface 250. In one embodiment, timing generator 200 can be implemented on a single integrated circuit.

Each microsequencer 205 is a microcontroller operating independently of each other, but in a coordinated manner. When synchronized, microsequencers 205A through 205G generate proper timing signals indirectly by outputting flags that are combined in PCL module 210 to produce control signals. Each microsequencer includes a counter (not shown) to sustain timing and generate a flag or set of flags for a specified amount of time. Microsequencers 205A through 205G are fully configurable and capable of supporting all current video standards. The differences between microsequencers 205A through 205G are (1) the number of flags maintained, (2) how the flags are fed as events to other microsequencers for coordinated operation, (3) how the flags are provided to PCL module 210 and (4) whether a particular microsequencer can be restarted. As is explained with reference to FIG. 3, microsequencers 205A through 205G can be partitioned in a variety of ways, such that tasks are distributed efficiently across the microsequencers. The outputs of microsequencers are coupled to PCL module 210 and to each other along a bus structure 270 that allows operation of the microsequencers to be coordinated.

PCL module 210 contains logic that allows a system programmer to select which combination of microsequencer flags generates control signals to be forwarded to other elements of a video encoder, such as video encoder 140. Specific examples related to control signals used for MACROVISION are discussed below. PCL module 210 has its output coupled to a variety of other elements within a video encoder that use the control signals to manipulate the video signals being processed.

Random access memory (RAM) 220 contains programs used by the microsequencers. The programs for all microsequencers 205A through 205G exist within RAM 220 to increase timing generator 200 flexibility and reduce gates needed in the implementation of timing generator 200. That is, RAM 220 is a shared resource among all microsequencers 205A through 205G. Within RAM 220 there are multiple programs running concurrently. The programs contained within RAM 220 are based on a microsequencer instruction set. Each command within the instruction set has four fields. These fields include a three bit opcode field that determines the command type and a one bit return flag field that determines whether to return from a subroutine. In addition, each command contains an eight bit field, referred to as the flag field, which is used to set flags within a microsequencer, select addresses, or to select which microsequencer to restart. Another twelve bit field, referred to as the count/register field, specifies a count or a register stack to select from stacks 240. The count parameter specifies how long a certain flag should be output by a microsequencer.

Arbiter 230 fetches instructions from RAM 230 for each microsequencer 205 in the set of microsequencers. Arbiter 230 provides arbitration of requests from microsequencers 205A through 205G to access memory resources within RAM 230

Stacks 240 comprises set of eight 16 bit shift registers. The registers are loaded with data that is accessed by the microsequencers based on the programs being run within RAM 220.

Control interface 250 provides a means for a host or other components to provide administrative instructions to timing generator 200. For example, control interface 250 can be used to receive an indication that MACROVISION copy processing process should begin. Upon receipt of such instruction, the proper information can be loaded into registers and the appropriate programs run from RAM 220.

The number of microsequencers and the specific function that each microsequencer performs (i.e., what flags will the microsequencer produce) is flexible. In alternate embodiments, any number of microsequencers can be used. However, typically between two and ten microsequencers will be used. In addition to the number of microsequencers, the specific function performed by each of the microsequencers can be varied based on the primary functions that timing generator 200 will perform.

Figure 3:
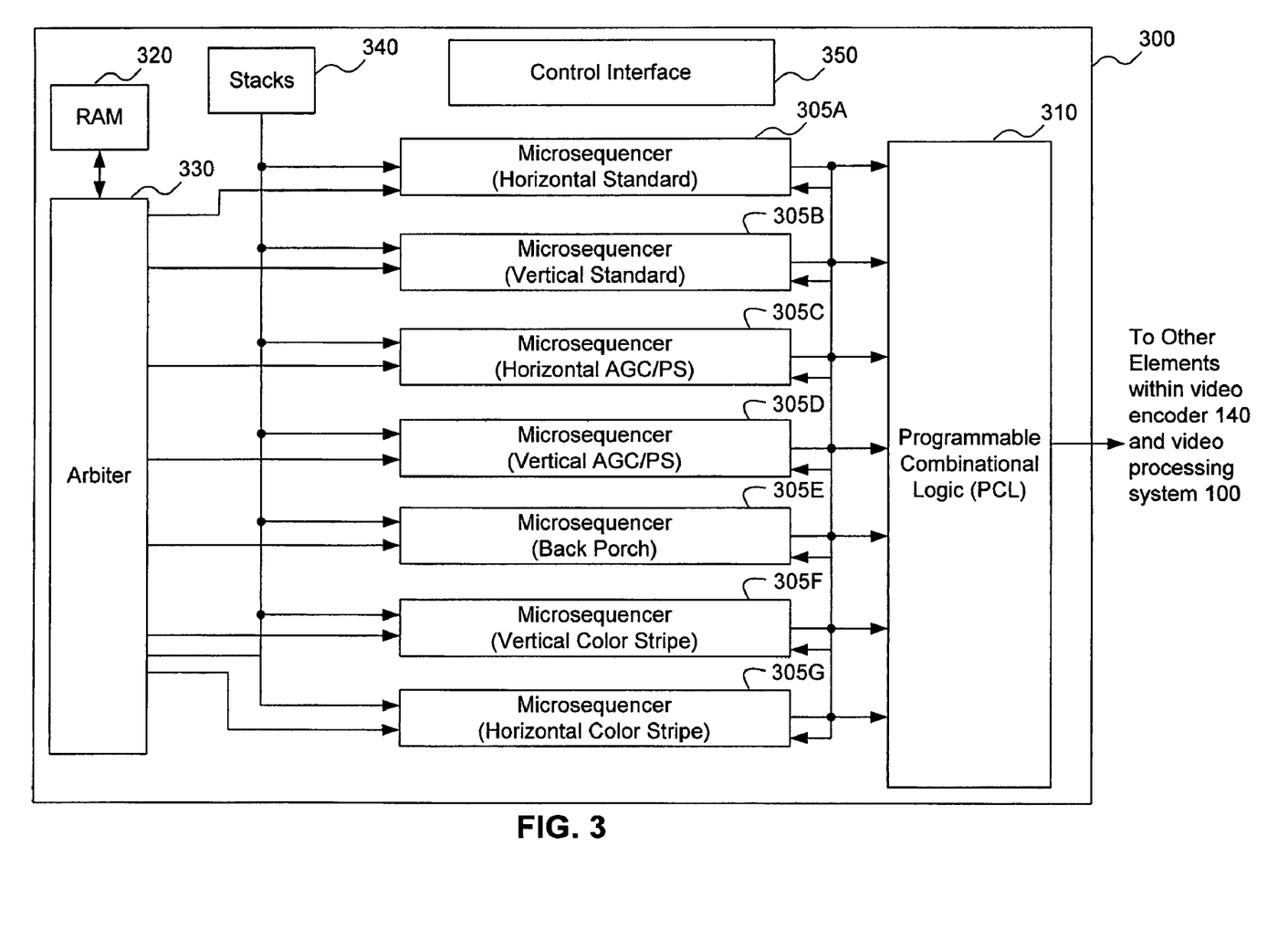
FIG. 3 is a diagram a timing generator designed for use with MACROVISION copy protection processes, according to an embodiment of the invention.

FIG. 3 is a diagram of an example timing generator 300 that has been designed to support MACROVISION copy protection process, according to an embodiment of the invention. Timing generator 300 is the same as timing generator 200 except that the design of the microsequencers, programs, and programmable combinational logic has been optimized to support MACROVISION copy protection process. As in the case of timing generator 200, timing generator 300 includes a set of microsequencers, such as microsequencers 305A through 305G; programmable combinational logic (PCL) module 310; random access memory 320; arbiter 330; stacks 340; and control interface 350.

The components of timing generator 300 are similar to those of timing generator 200, except that each of microsequencers 305A through 305G have been designed to perform specific operations in support of MACROVISION copy protection process. In particular, microsequencer 305A is configured to provide flags supporting the horizontal standard for MACROVISION. Microsequencer 305B is configured to support the vertical standard. Microsequencer 305C is configured to support the horizontal AGC/PS standard. Microsequencer 305D is configured to support the vertical AGC/PS standard. Microsequencer 305E is configured to support the back porch signal requirement. Microsequencer 305F is configured to support the vertical color stripe. And, microsequencer 305G is configured to support the horizontal color stripe. Configuring the microsequencers for a particular function entails providing programs to produce specific sets of flags associated with the function corresponding to the particular microsequencer. In addition, logic within programmable combinational logic module 310 is configured to expect certain flags from each of the microsequencer and to produce the appropriate control signal based on those flags. Timing Generator 300 provides one embodiment on how to implement the MACROVISION copy protection process, and is not intended to limit the scope of the invention. Based on the teachings herein, individuals skilled in the relevant arts will be able to discern additional embodiments.

Figure 4:
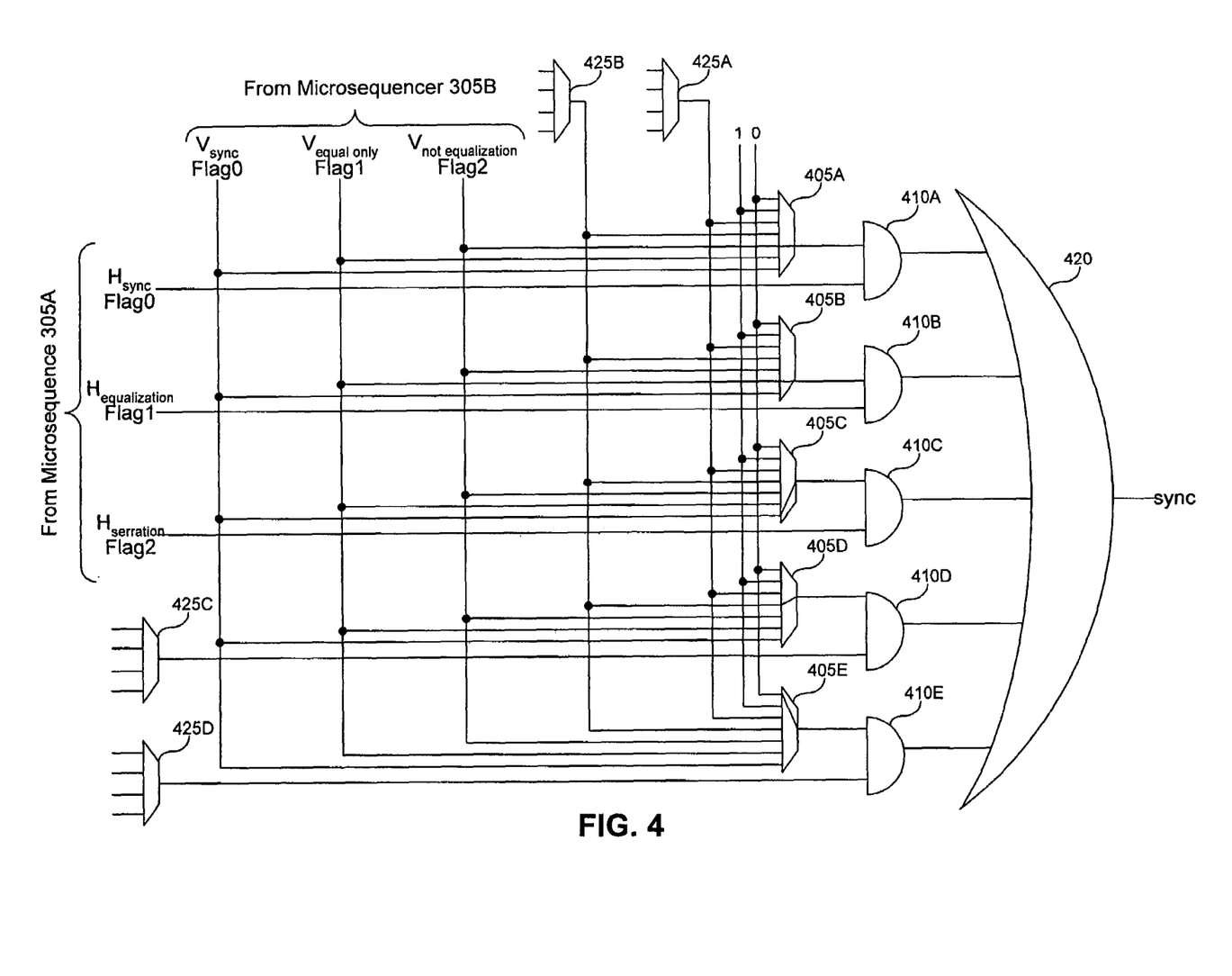
FIG. 4 is a diagram of programmable combinational logic, according to an embodiment of the invention.

FIG. 4 provides a diagram of programmable combinational logic, according to an embodiment of the invention. FIG. 4 provides explicit notation showing how flags that are output from microsequencers can be used to generate control signals by application of logic within a programmable combinational logic module, such as PCL module 310. The logic diagram includes multiplexers 405A through 405E, AND gates 410A through 410E, OR gate 420 and multiplexers 425A through 425D. The programmable logic within a PCL module is configured to mimic the operation of these types of devices to produce the desired control signal. In the example provided the principal flag inputs are from microsequencer 350A (horizontal standard) and microsequencer 350B (vertical standard). In addition, various inputs from other microsequencers would be input into multiplexers 425A through 425D. For ease of illustration, the specific inputs to multiplexers 425A through 425D will not be discussed. A discussion relative to the inputs of microsequencer 350A and 350B provides sufficient insight to individuals skilled in the relevant arts to understand the construction of the programmable combinational logic.

Microsequencer 350A produces three flags: $H_{sync}$, $H_{equalization}$, and $H_{serration}$. Microsequencer 350B also produces three flags: $V_{sync}$, $V_{equal\ only}$, and $V_{not\ equalization}$. Each of multiplexers 405A through 405E receives as inputs a low signal, a high signal, an output from multiplexer 425A, an output from multiplexer 425B, the $V_{not\ equalization}$ flag, the $V_{equal}$ flag and the $V_{sync}$ flag.

In this particular embodiment, multiplexer 405A has a register controlled input, such that only the $V_{not\ equalization}$ input will be permitted through. The register controlled input allows modification of the programmable combinational logic in a PCL module, such that the logic can be easily adapted for changes to the MACROVISION standard or for other purposes. In this case, when $V_{not\ equalization}$ is a 1, multiplexer 405A will transmit a 1, and when $V_{not\ equalization}$ is a 0, multiplexer 405A will transmit a 0. The output of multiplexer 405A is input into AND gate 410A. The other input of AND gate 410A is the $H_{sync}$ flag from microsequencer 350A. Therefore, when both $H_{sync}$ and $V_{not\ equalization}$ are a 1, AND gate 410A will output a 1. In all other cases, AND gate 410A will output a 0. The output of AND gate 410A is input into OR gate 420 to generate the Sync control signal. Thus, if both $H_{sync}$ and $V_{not\ equalization}$ are both a 1, the Sync control signal will be a 1. In all other cases, whether the Sync control signal is a 1 will be controlled by the other AND gates that are coupled to OR gate 420.

Multiplexer 405B has a register controlled input, such that only the $V_{equal\ only}$ input will be permitted through. In this case, when $V_{equal\ only}$ is a 1, multiplexer 405B will transmit a 1, and when $V_{equal\ only}$ is a 0, multiplexer 405B will transmit a 0. The output of multiplexer 405B is input into AND gate 410B. The other input of AND gate 410B is the $H_{equalization}$ flag from microsequencer 350A. Therefore, when both $H_{equalization}$ and $V_{equal\ only}$ are a 1, AND gate 410B will output a 1. In all other cases, AND gate 410B will output a 0. The output of AND gate 410B is input into OR gate 420 to generate the Sync control signal. Thus, if both $H_{equalization}$ and $V_{equal\ only}$ are both a 1, the Sync control signal will be a 1. In all other cases, whether the Sync control signal is a 1 will be controlled by the other AND gates that are coupled to OR gate 420.

Multiplexer 405C has a register controlled input, such that only the $V_{sync}$ input will be permitted through. In this case, when $V_{sync}$ is a 1, multiplexer 405C will transmit a 1, and when $V_{sync}$ is a 0, multiplexer 405C will transmit a 0. The output of multiplexer 405C is input into AND gate 410C. The other input of AND gate 410C is the $H_{serration}$ flag from microsequencer 350A. Therefore, when both $H_{serration}$ and $V_{sync}$ are a 1, AND gate 410C will output a 1. In all other cases, AND gate 410C will output a 0. The output of AND gate 410C is input into OR gate 420 to generate the Sync control signal. Thus, if both $H_{serration}$ and $V_{sync}$ are both a 1, the Sync control signal will be a 1. In all other cases, whether the Sync control signal is a 1 will be controlled by the other AND gates that are coupled to OR gate 420.

Multiplexer 405D has a register controlled input, such that only the input received from the output of multiplexer 425A will be permitted through. In this case, when the output of multiplexer 425A is a 1, multiplexer 405D will transmit a 1, and when the output of multiplexer 425A is a 0, multiplexer 405D will transmit a 0. The output of multiplexer 405D is input into AND gate 410D. The other input of AND gate 410D is the output of multiplexer 425C. Therefore, when both outputs from multiplexers 425A and 425C are a 1, AND gate 410D will output a 1. In all other cases, AND gate 410D will output a 0. The output of AND gate 410D is input into OR gate 420 to generate the Sync control signal. Thus, if both outputs from multiplexers 425A and 425C are 1, the Sync control signal will be a 1. In all other cases, whether the Sync control signal is a 1 will be controlled by the other AND gates that are coupled to OR gate 420. The inputs into multiplexers 425A and 425C will be other flags from microsequencers, subject to the desired functionality.

Multiplexer 405E has a register controlled input, such that only the input received from the output of multiplexer 425B will be permitted through. In this case, when the output of multiplexer 425B is a 1, multiplexer 405D will transmit a 1, and when the output of multiplexer 425B is a 0, multiplexer 405E will transmit a 0. The output of multiplexer 405E is input into AND gate 410E. The other input of AND gate 410E is the output of multiplexer 425D. Therefore, when both outputs from multiplexers 425B and 425D are a 1, AND gate 410E will output a 1. In all other cases, AND gate 410E will output a 0. The output of AND gate 410E is input into OR gate 420 to generate the Sync control signal. Thus, if both outputs from multiplexers 425B and 425D are 1, the Sync control signal will be a 1. In all other cases, whether the Sync control signal is a 1 will be controlled by the other AND gates that are coupled to OR gate 420. The inputs into multiplexers 425B and 425D will be other flags from microsequencers, subject to the desired functionality.

Similar programmable combinational logic can be developed to implement each of the other control signals described above, as will be apparent to individuals skilled in the relevant arts based on the teachings herein.

Figure 5:
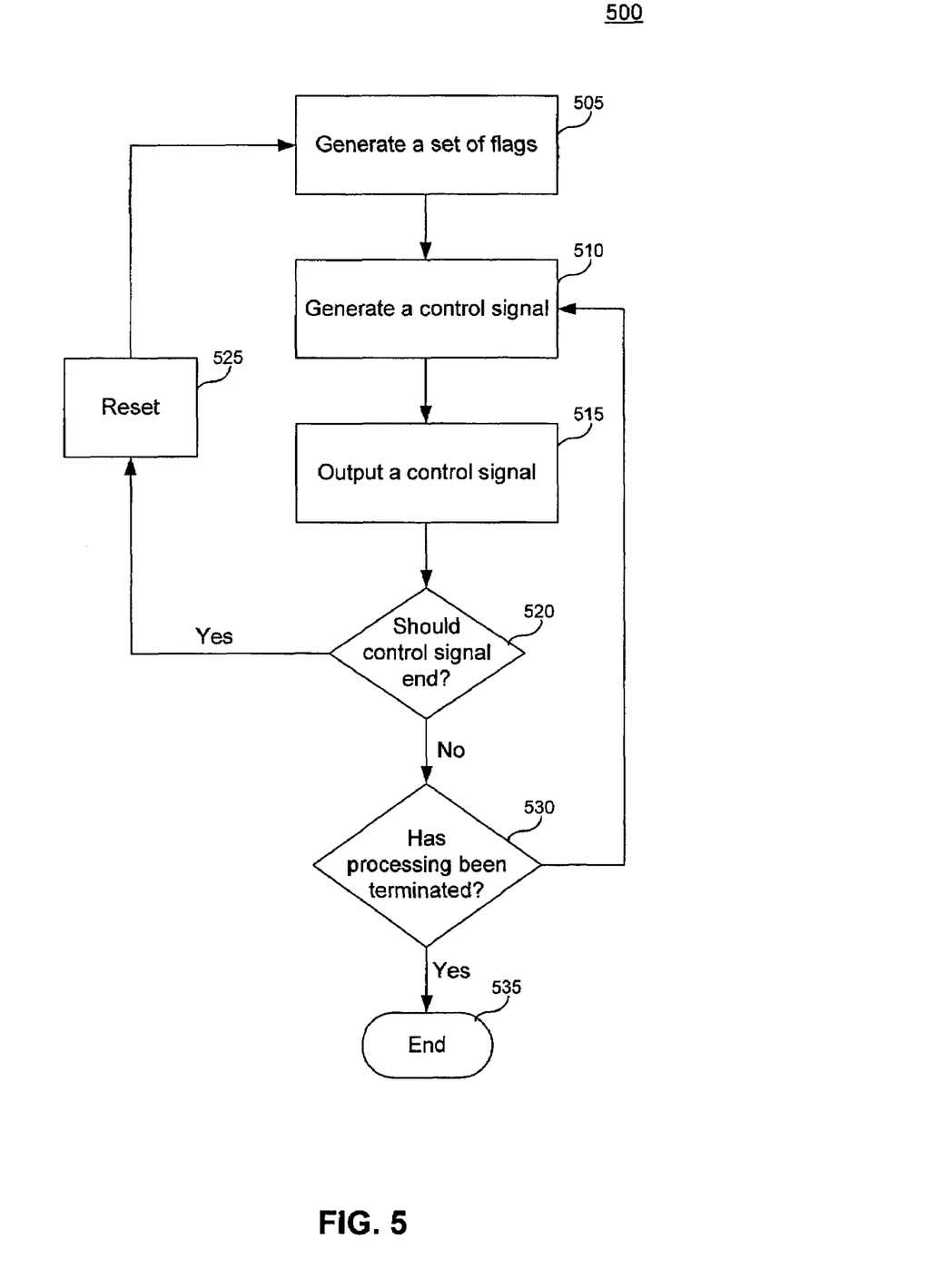
FIG. 5 is a flowchart of a method to generate a time-dependent control signal for video signals, according to an embodiment of the invention.

FIG. 5 is a flowchart of method 500 to generate a time-dependent control signal for video signals, according to an embodiment of the invention. Method 500 begins in step 505. In step 505, a set of flags is generated. In one embodiment, a set of flags can be generated by some or all of the microsequencers 205A through 205G executing programs that were accessed from RAM 220. In accessing programs from RAM, arbiter 230 can arbitrate access from the microsequencers, such that microsequencers can request programs simultaneously and arbiter 230 will arbitrate the access. For example, referring to FIG. 4, microsequencer 350A can generate flags $H_{sync}$, $H_{equalization}$ and $H_{serration}$. Similarly, microsequencer 350B can generate flags $V_{sync}$, $V_{equal\ only}$ and $V_{not\ equalization}$.

In step 510, a control signal is generated. For example, referring again to FIG. 4 the flags generated by microsequencer 350A and microsequencer 350B can be provided to PCL module 310 where the programmable combination logic described with reference to FIG. 4 can be applied to the flags to generate a Sync control signal, depending on the values of the flags.

In step 515, the control signal is output. For example, a Sync, AGC or back porch control signal can be provided to a V/H blank generator located within video encoder 140 to instruct a V/H blank generator to insert a blank line.

In step 520, a determination is made as to whether the control signal should continue to be output. For example, when generating a MACROVISION color stripe for a PAL signal, a color stripe replaces the color burst for two to five consecutive lines. Thus, the control signals must be output for a particular period of time to ensure that the color stripe is provided for the time is takes to output two to five lines. In this case, the programs running the microsequencers would contain counters to ensure that the appropriate flags were produced for the needed amount of time. If a determination is made that the control signal should end, method 500 proceeds to step 525. In step 525 the microsequencers are reset to stop producing the current flags, and a new program is loaded to begin producing the next set of flags necessary. Method 500 then proceeds back to step 505 to begin the process over with new programs loaded for the microsequencers.

If a determination is made that the control signal should not end in step 520, method 500 proceeds to step 530. In step 530 a determination is made whether processing should be terminated. If a determination is made that processing should end, method 500 proceeds to step 535, and method 500 ends. If a determination is made that processing should not end, method 500 returns to step 510 to continue to generate the control signal.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A timing generator for use within a video processing device, comprising:
    a random access memory;
    a plurality of microsequencers coupled to said random access memory that are configured to produce flags based on programs stored in said random access memory; and
    a programmable combinational logic module, coupled to said plurality of microsequencers, that is configured to generate control signals based on the flags produced by said plurality of microsequencers to support a copy protection process, wherein the programmable combinational logic module is configured to adapt to modifications in the copy protection process.

2. The timing generator of claim 1, further comprising:
    a plurality of shift registers, coupled to said plurality of microsequencers that provide operating parameters to said plurality of microsequencers.

3. The timing generator of claim 1, further comprising:
    a means for downloading software changes to said timing generator while said timing generator is processing a video signal without substantial interference to a video signal being processed.

4. The timing generator of claim 1, further comprising:
    an instruction set that enables said plurality of microsequencers to share said random access memory.

5. The timing generator of claim 1, wherein said plurality of microsequencers includes between two and ten microsequencers.

6. The timing generator of claim 5, wherein said plurality of microsequencers includes seven microsequencers.

7. The timing generator of claim 1, wherein said video processing device is a television.

8. The timing generator of claim 1, wherein said video processing device is a cable set-top box.

9. The timing generator of claim 1, wherein the programmable combinational logic includes a multiplexer that has a register controlled selection input.

10. A method for generating a time-dependent control signal for video signals, comprising the steps of:
    (a) storing a plurality of programs within a random access memory;
    (b) accessing a plurality of programs stored within the random access memory;
    (c) executing a set of programs from said plurality of programs by a plurality of microsequencers to generate a set of flags;
    (d) generating a control signal based on the set of flags through application of programmable combinational logic, wherein the programmable combinational logic module adapts to modifications in a copy protection process; and
    (e) outputting said control signal to implement the copy protection process.

11. The method of claim 10, wherein the step of accessing includes arbitrating the access to the random access memory by the plurality of microsequencers.

12. The method of claim 10, wherein the step of executing is completed in parallel by a plurality of microsequencers.

13. The method of claim 10, wherein the control signal is a horizontal sync control signal.

14. The method of claim 10, wherein the control signal is an external horizontal sync control signal.

15. The method of claim 10, wherein the control signal is an external vertical sync control signal.

16. The method of claim 10, wherein the control signal is a vertical blanking active control signal.

17. The method of claim 10, wherein the control signal is a color burst control signal.

18. The method of claim 10, wherein the control signal is a U Flip control signal.

19. The method of claim 10, wherein the control signal is a V Flip control signal.

20. The method of claim 10, wherein the control signal is a vertical sync control signal.

21. The method of claim 10, wherein the control signal is a vertical blank control signal.

* * * * *